B. G. PATTERSON.
SPRAYING NOZZLE.
APPLICATION FILED MAR. 7, 1918.
1,307,514.
Patented June 24, 1919.
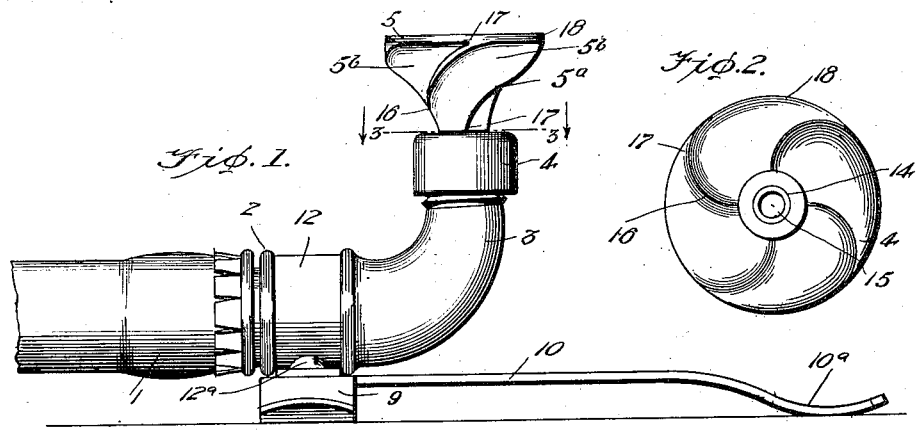
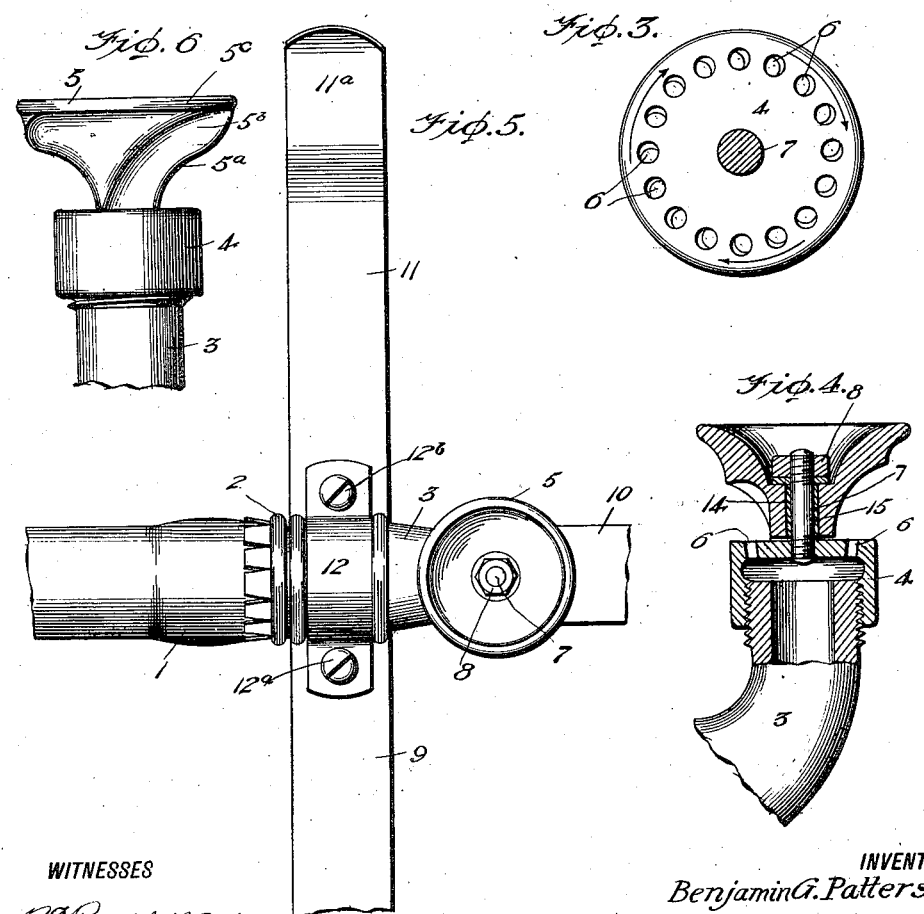
WITNESSES
INVENTOR
Benjamin G. Patterson
BY
ATTORNEYS

UNITED STATES PATENT OFFICE.

BENJAMIN G. PATTERSON, OF OKLAHOMA, OKLAHOMA.

SPRAYING-NOZZLE.

1,307,514.

Specification of Letters Patent. Patented June 24, 1919.

Application filed March 7, 1918. Serial No. 220,945.

*To all whom it may concern:*

Be it known that I, BENJAMIN G. PATTERSON, a citizen of the United States, and a resident of Oklahoma, in the county of Oklahoma and State of Oklahoma, have invented a new and useful Improvement in Spraying-Nozzles, of which the following is a specification.

This invention relates to new and useful improvements in spraying nozzles and more particularly to that type having a rotary spreader for attachment to the end of a stand pipe or hose and especially applicable for use as a lawn sprinkler.

It has been found in practice with lawn sprinklers that a serious fault results from the height at which the sprays are thrown in order to cover desirable area; at the ordinary height at which sprays are thrown, the winds, or even light breezes drive them about to the discomfort of people passing near or on porches of houses when the spraying is being done in the yard or lawn near the porch.

An object of my invention is to overcome above mentioned defects and to provide a spraying device that will distribute water uniformly over a maximum area of ground, and at the same time throw the spray at a relatively low elevation and in a substantially horizontal direction, so that it will be less liable to be driven about by winds or breezes.

Another object is to provide a spraying device that will conserve the water by delivering it to the ground in drops similar to rain and with a minimum amount reduced to a mist or vapor that may be carried away and dissipated into the air.

I attain these and other objects in the novel features of construction, combination and arrangements of parts as shown in the accompanying drawings in which—

Figure 1 is a side elevation of my device as in use,

Fig. 2 is a bottom plan view of the spreader member,

Fig. 3 is an enlarged plan view of the discharge pipe cap as it would appear on a section taken at line 3—3 of Fig. 1, Fig. 4 is a vertical section of the device with connecting L in elevation, Fig. 5 is a top plan view showing anchoring means, Fig. 6 is a side elevation of a slightly modified spreader member.

Referring more particularly to the drawing the usual hose connections are shown at 1 and 2 which are connected to an L 3. Closing the upper end of the L is the cap 4 which has threaded engagement with said L. Rotatably mounted on the cap 4 is the spreader 5 which is generally cone-shaped and has spiral ridges on its outer surface forming varying slopes in the valleys between the ridges, which will be more particularly described hereinafter. The cap 4 is provided with perforations 6 arranged in circle formation, such openings being materially inclined toward the right or in the direction indicated by the arrows in Fig. 3. These perforations also are inclined at an oblique angle to the axis of the cap and of the cone-shaped spreader 5 for a purpose which will later appear.

A journal or pivot for the spreader 5 is provided in the pin 7 projecting upwardly from the cap 4, said pin extending through the bushing 15, made of non-rusting material, and fitted within the opening 14 of the spreader 5. The device is supported or carried on a bracket or base consisting of three or more resilient prongs or wings 9, 10 and 11 having a radial disposition and clamped to the L 3 by a strap clip 12 by the screws 12ª and 12ᵇ for the purpose of anchoring and holding the sprayer in proper position when set upon the ground or lawn and to permit of ready removal and change of location of the device by sliding or dragging over the ground by the hose, the offset and turned-up end portions 10ª and 11ª permitting this movement.

Referring more specifically to the spreader 5 it is preferably made of heavy material which may be of itself non-rustable, or rendered so by a non-rust coating; it should also be of generally solid formation to provide the necessary weight. The spiral ridges 5ª on the spreader 5 are intervened by gradually sloping valleys 5ᵇ which do not offer any abrupt obstacle to the jets of water passing over them. The apex of the ridges occupy a curved or spiral position which permits a proper proportion of the water to discharge all along the edge, resulting in a uniform distribution of the water to every portion of the ground comprehended within the field of the spray; in other words, a square foot of ground immediately adjacent the device will receive approximately the same amount of water that will fall upon a square foot of ground at a distance of several feet from the device. This action is due to the fact that the spreader 5 deflects the water downwardly; in Figs. 1 and 2 it will be noted that the part of the ridge designated by numeral 16 directs a portion of the water to the ground immediately adjacent the device; the portion between 16 and 17 directs the water with increasing amount to the ground farther removed from the device than the zone first referred to and with still greater increase in amount or volume. The proper volume is also discharged between the points 17 and 18 resulting in a uniform distribution relative to the area covered by the spray.

The openings 6 by their twofold pitch or angularity in the cap 4 direct the jets of water at such angles that they are brought into contact with a retreating surface of the spreader, that is to say, the spreader 5 rotates at a high rate of speed and the water is made to strike the surface thereof while that surface is moving rapidly in the same direction, which in addition to the tendency of centrifugal force to discharge the water from the surface of the spreader, offers very little resistance to the force the water possessed before striking the spreader. The water leaves the spreader in good sized drops which will pierce the air with less resistance than it would meet if split up into smaller drops; this results in the water covering a maximum area without the necessity of being thrown at a great elevation. By the operation of this device no visible mist or vapor is created to float off or become dissipated into the atmosphere and a great saving of water necessarily results.

In the modified form shown in Fig. 6, a flange 5ᵉ is provided at the upper end of the spreader 5 which will tend to hold down the spray and direct it to a greater distance horizontally than if permitted its initial vertical direction.

I claim:—

1. In a device as characterized, a nozzle cap adapted for removable attachment to a discharge pipe, said cap including an outer wall provided with a continuous circle of perforations therethrough which lean forwardly and outwardly.

2. In a device of the character described, in combination, a water discharge nozzle member having a circular series of perforations through its discharge end, said perforations being inclined from their inner to their outer ends outwardly with respect to the axis of the nozzle and said perforations being also inclined from their inner to their outer ends in the same general direction as the circumference of the circle in which they are disposed, and a spreader member of inverted cone-shaped form rotatably mounted in advance of said nozzle member, the outer face of said spreader member provided with spiral grooves extending from apex to base thereof.

3. In a device of the character described in combination, a rotatable spreader including an inverted cone-shaped member, the outer face thereof provided with spiral ridges intervened by gradually sloping valleys, and a nozzle member upon which said spreader is rotatably mounted, said nozzle provided with a series of perforations arranged in continuous circle intermediate the axis and periphery thereof, said perforations inclined from their inner to their outer ends outwardly with respect to the axis of the nozzle and also inclined in the same general direction as the circumference of the circle in which they are disposed, said perforations adapted to discharge jets of water into the aforesaid sloping valleys intervening the spiral ridges of the spreader.

4. A spraying device consisting of a nozzle having a perforated diaphragm at its outer end, the perforations therethrough arranged in a continuous circle and inclined outwardly and forwardly with respect to the circular disposition of same, and a spreader member rotatably mounted in advance of the nozzle, said spreader of inverted cone-shape and having its outer surface provided with spiral ridges and intervening sloping valleys, said valleys sloping outwardly and terminating at the base of the cone in a continuous circular flange for directing a spray in an approximately horizontal direction.

BENJAMIN G. PATTERSON.